United States Patent
Hu et al.

(10) Patent No.: US 10,437,244 B2
(45) Date of Patent: Oct. 8, 2019

(54) REMOTE VEHICLE INSTURCTION

(71) Applicant: Ford Global Technologies, LLC, Dearborn, MI (US)

(72) Inventors: Jeffrey Yizhou Hu, Ann Arbor, MI (US); David Anthony Hatton, Orchard Lake, MI (US); Stefan Bankowski, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 237 days.

(21) Appl. No.: 15/652,545

(22) Filed: Jul. 18, 2017

(65) Prior Publication Data

US 2019/0025814 A1    Jan. 24, 2019

(51) Int. Cl.
| G01C 21/36 | (2006.01) |
| G05D 1/00 | (2006.01) |
| G01C 21/34 | (2006.01) |

(52) U.S. Cl.
CPC ....... *G05D 1/0016* (2013.01); *G01C 21/3438* (2013.01); *G01C 21/362* (2013.01); *G05D 1/0022* (2013.01); *G05D 2201/0213* (2013.01)

(58) Field of Classification Search
CPC .............. G01C 21/3438; G01C 21/362; G05D 1/0022; G05D 2201/0213; G05D 1/0016; B60R 2325/205; G06Q 50/30; G06Q 10/02; G06Q 10/087; G06Q 30/0645; H04L 67/12
USPC ...................................... 701/2, 31.5, 23, 425
See application file for complete search history.

(56) References Cited

U.S. PATENT DOCUMENTS

| 6,529,808 | B1* | 3/2003 | Diem | G01R 31/006 701/31.5 |
| 8,143,994 | B2* | 3/2012 | Jung | H04L 67/12 340/3.31 |
| 8,538,408 | B2* | 9/2013 | Howarter | B60R 25/2009 455/420 |
| 9,194,168 | B1* | 11/2015 | Lu | E05F 15/70 |
| 9,195,938 | B1 | 11/2015 | Bonawitz et al. | |
| 9,547,985 | B2 | 1/2017 | Tuukkanen | |
| 2005/0125110 | A1* | 6/2005 | Potter | B60R 16/0373 701/1 |
| 2010/0070168 | A1* | 3/2010 | Sumcad | G01C 21/3438 701/467 |
| 2010/0228405 | A1* | 9/2010 | Morgal | B62H 3/02 701/2 |
| 2011/0060480 | A1* | 3/2011 | Mottla | G06Q 10/02 701/2 |
| 2014/0129054 | A1* | 5/2014 | Huntzicker | B60R 25/24 701/2 |

(Continued)

*Primary Examiner* — Richard A Goldman
(74) *Attorney, Agent, or Firm* — Frank A. MacKenzie; Bejin Bieneman PLC (57) ABSTRACT

A system includes a mobile computer programmed to receive, from a vehicle computer, an instruction to proceed to a location and vehicle operation data from an in-vehicle communications network. The mobile computer is programmed to determine that a vehicle is ready to proceed to the location based on the operation data. The mobile computer is programmed to receive user input approving transitioning from a boarding state to a driving state. The mobile computer is programmed to then instruct the vehicle computer to actuate vehicle components to proceed to the location.

20 Claims, 6 Drawing Sheets

(56) References Cited

U.S. PATENT DOCUMENTS

| | | | |
|---|---|---|---|
| 2014/0172228 A1* | 6/2014 | Wilson | B60W 50/02 701/31.5 |
| 2014/0278061 A1* | 9/2014 | Michael | G06Q 30/02 701/423 |
| 2015/0268059 A1* | 9/2015 | Borghesani | H04W 4/029 701/32.3 |
| 2015/0339923 A1* | 11/2015 | Konig | G08G 1/202 701/522 |
| 2016/0027307 A1* | 1/2016 | Abhyanker | G08G 1/005 701/117 |
| 2016/0189435 A1* | 6/2016 | Beaurepaire | G05D 1/021 705/13 |
| 2016/0301698 A1* | 10/2016 | Katara | G07B 13/02 |
| 2016/0358389 A1 | 12/2016 | Menard et al. | |
| 2016/0364678 A1* | 12/2016 | Cao | G06Q 50/30 |
| 2017/0123422 A1* | 5/2017 | Kentley | B60H 1/00735 |
| 2017/0132934 A1* | 5/2017 | Kentley | G08G 1/202 |
| 2018/0025328 A1* | 1/2018 | Penilla | G06Q 10/1095 705/305 |
| 2018/0060827 A1* | 3/2018 | Abbas | G05D 1/0088 |
| 2019/0018411 A1* | 1/2019 | Herbach | H04N 7/183 |
| 2019/0178656 A1* | 6/2019 | Stegall | G01C 21/3438 |

\* cited by examiner

REMOTE VEHICLE INSTURCTION

BACKGROUND

A vehicle typically operates based on information communicated between one of more vehicle computers, e.g., electronic control units (ECUs) or the like, and vehicle components. Communication between the vehicle computer(s) and the vehicle components can provide for actuation of the components to operate the vehicle, i.e., to control movement of the vehicle wherein the components include one or more of steering, braking, and powertrain components. Vehicle operation may be performed according to user input to vehicle control interfaces for various components, e.g., an accelerator pedal, brake pedal, and steering wheel are examples of such control interfaces. A problem arises where such control interfaces are not present on or in a vehicle, or at least are not readily available to an occupant of the vehicle.

DETAILED DESCRIPTION

Introduction

A system can include a mobile computer programmed to receive, from a vehicle computer, an instruction to proceed to a location and vehicle operation data from an in-vehicle communications network. The mobile computer is programmed to determine that a vehicle is ready to proceed to the location based on the operation data. The mobile computer is programmed to receive user input approving transitioning from a boarding state to a driving state. The mobile computer is programmed to then instruct the vehicle computer to actuate vehicle components to proceed to the location.

The vehicle operation data may include at least one of a vehicle door status and a vehicle seat occupancy status.

The vehicle operation data may include at least one of a powertrain status, a brake status, and a steering status.

The in-vehicle communications network may be a controller area network (CAN) bus.

The mobile computer may be further programmed for wireless communication with the vehicle computer.

The mobile computer may be further programmed to display a request for the input approving transitioning from the boarding state to the driving state before receiving the input. The mobile computer may be programmed to transmit the input to the vehicle computer upon receiving the input.

The mobile computer may be further programmed to receive, from the vehicle computer, the location along with the request for the input approving transitioning from the boarding state to the driving state. The mobile computer may be programmed to display the location along with a request for the input.

The mobile computer may be further programmed to receive, from the vehicle computer, in addition to the instruction to proceed to the location, a route to the location. The mobile computer may be programmed to display the route along with the request for the input approving transitioning from the boarding state to the driving state.

The system may include the vehicle computer. The vehicle computer may be programmed to receive the location from a remote computer. The vehicle computer may be programmed to actuate the vehicle components to proceed to the location.

The vehicle computer may be further programmed to receive, from the remote computer, in addition to the instruction to proceed to the location, a route to the location. The vehicle computer may be programmed to actuate the vehicle components to proceed to the location along the route.

A system can include a vehicle computer programmed to receive, from a remote computer, an instruction to proceed to a location. The vehicle computer is programmed to determine that a vehicle is ready to proceed to the location based on vehicle operation data from an in-vehicle communications network. The vehicle computer is programmed to transmit, to a mobile computer, the instruction to proceed to the location. The vehicle computer is programmed to, upon receipt of an instruction from the mobile computer, actuate vehicle components to proceed to the location.

The vehicle operation data may include at least one of a vehicle door status, a vehicle seat occupancy status, a powertrain status, a brake status, and a steering status.

The in-vehicle communications network may be a controller area network (CAN) bus.

The vehicle computer may be further programmed for wireless communication with the mobile computer.

The vehicle computer may be further programmed to display a request for an input approving transitioning from a boarding state to a driving state. The vehicle computer may be programmed to receive the input. The vehicle computer may be programmed to then actuate vehicle components to proceed to the location.

The vehicle computer may be further programmed to receive, from the mobile computer, in addition to the instruction from the mobile computer, a route to the location. The vehicle computer may be programmed to display the route along with the request for the input approving transitioning from the boarding state to the driving state.

The vehicle computer may be further programmed to transmit, to the mobile computer, the location along with a request for an input approving transitioning from a boarding state to a driving state, wherein the instruction from the mobile computer incudes the input.

The vehicle computer may be further programmed to transmit, to the mobile computer, in addition to the instruction to proceed to the location, a route to the location A system can include a vehicle computer programmed to receive an instruction to proceed to a location and vehicle operation data. The vehicle computer is programmed to transmit the operation data. The system includes a mobile computer programmed to receive the instruction to proceed to the location and the operation data. The mobile computer is programmed to determine that a vehicle is ready to proceed based on the operation data. The mobile computer is programmed to receive user input approving the location.

The mobile computer is programmed to then instruct actuation of the vehicle to proceed to the location.

The vehicle computer may receive the operation data from an in-vehicle communications network. The vehicle computer may be further programmed to transmit the operation data to the mobile computer.

A method can include receiving, from a vehicle computer, an instruction to proceed to a location and vehicle operation data from an in-vehicle communications network. The method includes determining that a vehicle is ready to proceed to the location based on the operation data. The method includes receiving user input approving transitioning from a boarding state to a driving state. The method includes then instructing the vehicle computer to actuate vehicle components to proceed to the location.

The vehicle operation data may include at least one of a vehicle door status, a vehicle seat occupancy status, a powertrain status, a brake status, and a steering status.

The in-vehicle communications network may be a controller area network (CAN) bus.

The method may include displaying a request for the input approving transitioning from the boarding state to the driving state before receiving the input. The method may include transmitting the input to the vehicle computer upon receiving the input.

The method may include receiving, from the vehicle computer, the location along with the request for the input approving transitioning from the boarding state to the driving state. The method may include displaying the location along with a request for the input.

The method may include receiving, from the vehicle computer, in addition to the instruction to proceed to the location, a route to the location. The method may include displaying the route along with the request for the input approving transitioning from the boarding state to the driving state.

A computer can be programmed to perform the above method steps.

A computer readable medium can store program instructions executable by a computer processor to perform the above method steps.

A method can include receiving, from a remote computer, an instruction to proceed to a location. The method includes determining that a vehicle is ready to proceed to the location based on vehicle operation data from an in-vehicle communications network. The method includes transmitting, to a mobile computer, the instruction to proceed to the location. The method includes, upon receipt of an instruction from the mobile computer, actuating vehicle components to proceed to the location.

The vehicle operation data may include at least one of a vehicle door status, a vehicle seat occupancy status, a powertrain status, a brake status, and a steering status.

The in-vehicle communications network may be a controller area network (CAN) bus.

The method may include displaying a request for an input approving transitioning from a boarding state to a driving state. The method may include receiving the input. The method may include then actuating vehicle components to proceed to the location.

The method may include transmitting, to the mobile computer, the location along with a request for an input approving transitioning from a boarding state to a driving state, wherein the instruction from the mobile computer incudes the input.

A computer can be programmed to perform the above method steps.

A computer readable medium can store program instructions executable by a computer processor to perform the above method steps.

Figure 1:
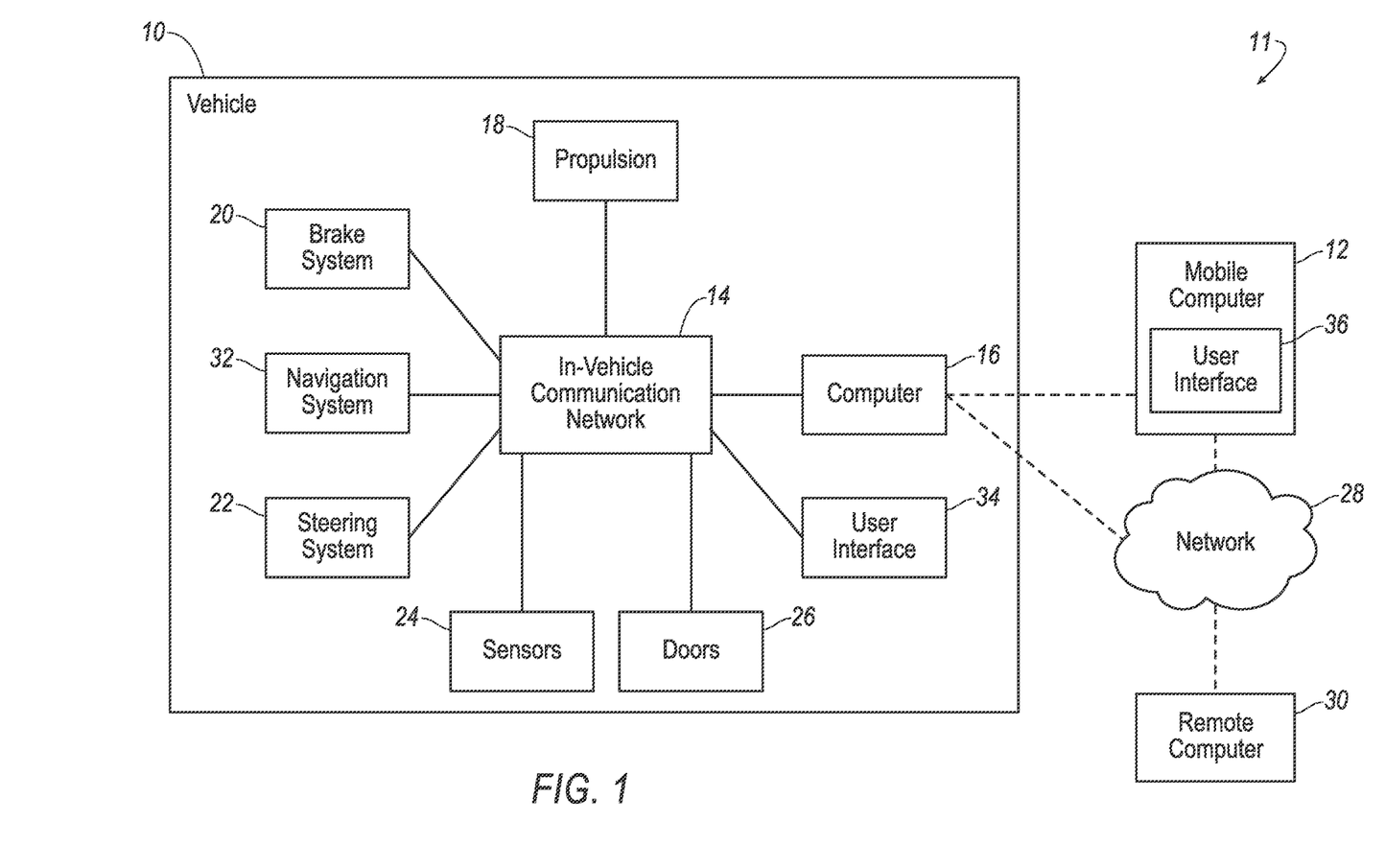
FIG. 1 is a block diagram of an example system for providing remote vehicle instruction.

With reference to the Figures, a problem of instructing a vehicle 10 to operate, e.g., to execute one or more movements and/or to proceed to a specified location absent vehicle 10 control interfaces operable by an occupant of the vehicle 10 is addressed in a system 11 that includes a mobile computer 12 configured to receive each of (i) vehicle 10 operation data provided via an in-vehicle communication network 14, and (ii) input from a user. Accordingly, the system 11 for providing remote vehicle 10 instruction includes the mobile computer 12 programmed to receive, from a vehicle 10 computer 16, an instruction to proceed to a location. The mobile computer 12 is programmed to receive vehicle 10 operation data from the in-vehicle communications network 14. The mobile computer 12 is programmed to determine that the vehicle 10 is ready to proceed to the location based on the operation data. The mobile computer 12 is programmed to receive user input approving transitioning from a boarding state to a driving state, and then to instruct the vehicle 10 computer 16 to actuate vehicle 10 components to proceed to the location.

When this disclosure refers to a "location," it is to be understood that the location could be determined in a known manner, e.g., according to geo-coordinates such as are known. For example, global positioning system (GPS) devices can determine latitude and longitude, and could be used to determine locations discussed herein.

As used herein, vehicle 10 "operation data" is data describing a status and/or state of one or more vehicle 10 component. The vehicle 10 operation data may include a vehicle 10 door 26 status, a vehicle 10 seat occupancy status, a powertrain status, a brake status, a steering status, etc. Vehicle 10 operation data is received from vehicle 10 components such as a propulsion 18, a brake system 20, a steering system 22, sensors 24, etc. Vehicle 10 operation data is received via the in-vehicle communication network 14, such as a controller area network (CAN) bus.

For example, the vehicle 10 door 26 status may describe that one or more vehicle 10 doors 26 are in an open or closed position, that one or more doors 26 are in a locked or unlocked state, etc.

For example, the vehicle 10 seat occupancy status may describe that certain seats of the vehicle 10 are occupied, e.g., based on data from occupancy sensors 24. The vehicle 10 seat occupancy status may describe that a vehicle 10 seat is occupied, that a seat belt is buckled etc.

For example, the powertrain status may describe that the powertrain is operable, not operable, operable in a limp home status, e.g., operable to propel the vehicle 10 at a limited rate of speed, e.g., 15 miles per hour, etc.

For example, the brake status may describe that disc and/or drum brakes of the brake system 20 are in an "on" or "off" state, that a parking brake of the brake system 20 is in an "on" or "off" state, that the brake system 20 is operable, that the brake system 20 is not operable, etc.

For example, the steering status may describe that the road wheels are turned to a certain angle, that the steering system 22 is operable, that the steering system 22 is not operable, etc.

The Wide Area Network

A network 28 (sometimes referred to as a wide area network because it can include communications between devices that are geographically remote from one another, i.e., not in a same building, vehicle 10, etc.,) represents one or more mechanisms by which remote devices, e.g., the vehicle 10, the mobile computer 12, a remote computer 30, etc., may communicate with each other. Accordingly, the network 28 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The Vehicle

The vehicle 10 may include any passenger or commercial automobile such as a car, a truck, a sport utility vehicle, a crossover vehicle, a van, a minivan, a taxi, a bus, etc. The vehicle 10 may operate in an autonomous (e.g., driverless) mode, a semi-autonomous mode, and/or a non-autonomous mode. For purposes of this disclosure, an autonomous mode is defined as one in which each of the propulsion 18, the brake system 20, and the steering system 22 of the vehicle 10 are controlled by one or more vehicle 10 computers 16; in the semi-autonomous mode computer(s) 16 of the vehicle 10 control(s) one or two of the vehicle 10 propulsion 18, brake system 20, and steering system 22; each of these are controlled by a human operator in the non-autonomous mode. The vehicle 10 may additionally include the sensors 24, a navigation system 32, a user interface 34, and the in-vehicle communication network 14 for providing communication between the vehicle 10 components.

The propulsion 18 of the vehicle 10 translates stored energy into motion of the vehicle 10. The propulsion 18 may be a conventional vehicle 10 subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion 18. The propulsion 18 is in communication with and receives input from the vehicle 10 computer 16 and from a human driver. The human driver may control the propulsion 18 via an input device, e.g., an accelerator pedal and/or a gear-shift lever. The propulsion 18 may send operation data, e.g., describing the powertrain status, to the vehicle 10 computer 16 via the in-vehicle communication network 14.

The brake system 20 can be a conventional vehicle 10 subsystem that resists the motion of the vehicle 10 to thereby slow and/or stop the vehicle 10. The brake system 20 may be friction brakes such as disc brakes, drum brakes, band brakes, etc.; regenerative brakes; the parking brake; any other suitable type of brakes; or a combination. The brake system 20 can include an electronic control unit (ECU) or the like that actuates the brake system 20 to resist the motion of the vehicle 10, e.g., in response to a command from the vehicle 10 computer 16 and/or from a human driver. The human driver may control the brake system 20 via an input device, e.g., a brake pedal. The brake system 20 may send operation data, e.g., describing the brake status, to the vehicle 10 computer 16 via the in-vehicle communication network 14.

The steering system 22 is typically a conventional vehicle 10 subsystem and controls the turning of the wheels. The steering system 22 is in communication with and receives input from a steering wheel and/or the vehicle 10 computer 16. The steering system 22 may be a rack-and-pinion system with electric power-assisted steering, a steer-by-wire system, as are both known in the art, or any other suitable system. The steering system 22 may send operation data, e.g., describing the steering status, to the vehicle 10 computer 16 via the in-vehicle communication network 14.

The door 26 covers an opening in the vehicle 10 to provide or prohibit entry and egress to and from a passenger cabin of the vehicle 10. The door 26 may be implemented with various circuits, chips, wiring, electric motors, hydraulic cylinders, linear actuators, etc. The door 26 moves between an open position and a closed position. The door 26 may include a door 26 lock. The door 26 lock includes a lock portion and a latch. The lock portion of the door 26 lock prevents movement of the latch. The lock portion thus secures the vehicle 10 door 26 to a body of the vehicle 10, preventing the vehicle 10 door 26 from opening. The door 26 lock can be actuated from an unlocked position to a locked position, and vice versa. In the unlocked position, the vehicle 10 door 26 can move to the open position, allowing the user to enter or exit the vehicle 10. When the door 26 is closed and the door 26 lock is the locked position, the vehicle 10 door 26 is prohibited from moving to the open position. For example, in the locked position, the door 26 lock can include a bolt that moves toward the vehicle 10 body to engage the latch, preventing the vehicle 10 door 26 from moving away from the vehicle 10 body. The vehicle 10 door 26 may send operation data, e.g., describing the door 26 status, to the vehicle 10 computer 16 via the in-vehicle communication network 14.

The vehicle 10 sensors 24 may detect internal states of the vehicle 10, for example, wheel speed, wheel orientation, tire pressure, suspension travel, brake sensors 24, traction control sensors 24, and engine and transmission variables. The vehicle 10 sensors 24 may detect the position or orientation of the vehicle 10, for example, global positioning system (GPS) sensors 24; accelerometers such as piezo-electric or microelectromechanical systems (MEMS); gyroscopes such as rate, ring laser, or fiber-optic gyroscopes; inertial measurements units (IMU); and magnetometers. The vehicle 10 sensors 24 may detect the external world, for example, light measurement sensors 24, photometers, microphones, wind speed measurement sensors 24, radar sensors 24, scanning laser range finders, light detection and ranging (LIDAR) devices, and image processing sensors 24 such as cameras. The vehicle 10 sensors 24 may be occupancy sensors 24 programmed to detect occupancy of one or more vehicle 10 seats. The occupancy sensors 24 may be visible-light or infrared cameras directed at the seat(s), weight sensors 24 positioned to detect a force applied to a seat, sensors 24 detecting whether a seat belt for the seat is buckled or unspooled, or other suitable sensors 24.

The vehicle 10 navigation system 32 determines a location and orientation of the vehicle 10 according to map data, e.g., by geocoordinates and compass heading direction that can be used to determine the vehicle 10 location and orientation on a map. The map data may include roads and related data, such as a number of lanes, parking lot locations, etc. To determine the location and orientation of the vehicle 10, the vehicle 10 navigation system 32 may rely on information from a global navigation satellite system, distance data from vehicle 10 sensors 24 attached to a drivetrain of the vehicle 10, a gyroscope, an accelerometer, a magnetometer, and/or other vehicle 10 sensors 24. The map data may be stored locally, such as in the vehicle 10 computer 16 memory (discussed below), in the vehicle 10 navigation system 32, etc., and/or remotely, such as in the remote computer 30. Exemplary vehicle 10 navigation systems 32 include known GPS (global positioning system) navigation devices, personal navigation devices, and automotive navigation systems.

The user interface 34 presents information to and receives information from an occupant of the vehicle 10. The user interface 34 may be located, e.g., on an instrument panel in the passenger cabin of the vehicle 10, or wherever may be readily seen by the occupant. The user interface 34 may include dials, digital readouts, screens such as a touch-sensitive display screen, speakers, and so on for providing information to the occupant, e.g., human-machine interface (HMI) elements. The user interface 34 may include buttons, knobs, keypads, microphone, and so on for receiving information from the occupant.

The in-vehicle communication network 14 includes hardware, such as a communication bus, for facilitating communication among vehicle 10 components. The in-vehicle communication network 14 may facilitate wired or wireless communication among the vehicle 10 components in accordance with a number of communication protocols such as controller area network (CAN), Ethernet, WiFi, Local Interconnect Network (LIN), and/or other wired or wireless mechanisms.

The vehicle 10 computer 16, implemented via circuits, chips, antenna and/or other electronic components, is included in the vehicle 10 for carrying out various operations and processes, including those described herein. The vehicle 10 computer 16 is a computing device that generally includes a processor and a memory, the memory including one or more forms of computer-readable media, and storing instructions executable by the processor for performing various operations and processes, including those disclosed herein. The memory of the vehicle 10 computer 16 further generally stores remote data received via various communications mechanisms; e.g., the vehicle 10 computer 16 is generally configured for communications with vehicle 10 components on the in-vehicle communication network 14, e.g., a controller area network (CAN) bus, and for using other wired or wireless protocols to communicate with devices outside the vehicle 10, e.g., Universal Serial Bus (USB), Bluetooth®, IEEE 802.11 (colloquially referred to as WiFi), satellite telecommunication protocols, and cellular protocols such as 3G, LTE, etc. Via the in-vehicle communication network 14 using the CAN bus the vehicle 10 computer 16 may transmit messages to various devices in the vehicle 10 and/or receive messages from the various devices, e.g., the propulsion 18, the brake system 20, the steering system 22, the sensors 24, etc., e.g., as discussed herein. For example, the vehicle 10 computer 16 may receive data from vehicle 10 sensors 24. Although one vehicle 10 computer 16 is shown for ease of illustration, it is to be understood that the vehicle 10 computer 16 could include, and various operations described herein could be carried out by, one or more computing devices.

The vehicle 10 computer 16 may be programmed for wireless communication with the mobile computer 12. For example, the vehicle 10 computer 16 may store identification information, e.g., a unique name or other identifier, Internet protocol (IP) address, etc., for the mobile computer 12. The vehicle 10 computer 16 may establish a wireless communication link with the mobile computer 12, e.g., a WiFi connection, a Bluetooth® connection, etc.

The vehicle 10 computer 16 may be programmed for wired communication with the mobile computer 12, as described for the wireless communication. The vehicle 10 computer 16 may establish a wired communication link with the mobile computer 12, e.g., via a USB connection.

The vehicle 10 computer 16 may be programmed to receive an instruction to proceed to a location. The instruction to proceed is an instruction received from the remote computer 30 to navigate to the location. The instruction to proceed may additionally or alternatively be received from the mobile computer 30. The instruction to proceed may include the location, e.g., GPS coordinates. The instruction to proceed include a route. As used herein, "route" is a series of one or more locations and/or roads to be used for navigating the vehicle 10 to proceed to the location.

The vehicle 10 computer 16 may be programmed to transmit the instruction to proceed to the mobile computer 12. For example, the vehicle 10 computer 16 may transmit such instruction to the mobile computer 12 via wireless or wired communication. The transmitted instruction to proceed may include the location and the route.

The vehicle 10 computer 16 is programmed to receive vehicle 10 operation data from the in-vehicle communications network 14. For example, the vehicle 10 computer 16 may identify data received from the propulsion 18, the brake system 20, the steering system 22, the sensors 24, the doors 26, etc., as describing the vehicle 10 door 26 status, the vehicle 10 seat occupancy status, the powertrain status, the brake status, the steering status, etc.

The vehicle 10 computer 16 may be programmed to transmit the vehicle 10 operation data to the mobile computer 12. For example, the vehicle 10 computer 16 may transmit such data to the mobile computer 12 via wireless or wired communication.

The vehicle 10 computer 16 may be programmed to transmit, to the mobile computer 12, a request for an input approving transitioning from a boarding state to a driving state, the location of the instruction to proceed, and/or the route of the instruction to proceed. For example, the vehicle 10 computer 16 may transmit such request to the mobile computer 12 via wireless or wired communication.

As used herein, "boarding state" is a state of the vehicle 10 which permits passengers to enter and/or exit the vehicle 10. For example, in the boarding state, doors 26 of the vehicle 10 may be unlocked, the braking system 20 may be actuated to prevent movement of the vehicle 10, e.g., the parking brake may be in an "on" state, etc.

As used herein, "driving state" is a state of the vehicle 10 where the vehicle 10 may be navigated to proceed to a location. For example, in the driving state, doors 26 of the vehicle 10 may be locked, the parking brake may be in an "off" state, the steering system 22, brake system 20 and propulsion 18 may be operational to receive instruction to actuate to navigate the vehicle 10, etc.

The vehicle 10 may transition from one state to another, e.g., from the boarding state to the driving state, or vice versa, by the vehicle 10 computer 16 sending instructions to one or more vehicle 10 components associated with the transition. For example, to transition the vehicle 10 from the boarding state to the driving state the vehicle 10 computer 16 may instruct the doors 26 of the vehicle 10 to actuate from the unlocked state to the locked state, the parking brake of the brake system 20 to actuate from the "on" state to the "off" state, etc.

The vehicle 10 computer 16 may be programmed to determine that the vehicle 10 is ready to proceed to the location based on the vehicle 10 operation data. As used herein, "ready to proceed" means that predefined criteria are satisfied for the vehicle 10 to transition from the boarding state to the driving state and to navigate to the location. For example, ready to proceed criteria may include one or more of that critical vehicle 10 components are operating without fault, that the vehicle 10 door 26 status is that the doors 26 are in the closed position, that the vehicle 10 seat occupancy status is that occupants are seated and seat belts are in place, that the powertrain status is that the propulsion 18 is ready to accept actuation instructions, that the brake status is that the brake system 20 is ready to accept actuation instructions, that the steering status is that the steering system 22 is ready to accept actuation instructions, etc.

Critical vehicle components include components needed for operation of the vehicle 10 to safely travel on a public roadway, e.g., to navigate to a location, to detect an object that may pose a collision risk, etc. Example critical components include the brake system 20, the steering system 22, the propulsion 18, the sensors 24, e.g., sensors 24 used to navigate the vehicle 10, the navigation system 32, etc. The critical components may be stored in a lookup table or the like, e.g., in the memory of the vehicle 10 computer 16.

The vehicle 10 computer 16 may be programmed to display the request for the input approving transitioning from the boarding state to the driving state. For example, the vehicle 10 computer 16 may instruct the user interface 34 of the vehicle 10 to display such request. Similarly, the vehicle 10 computer 16 may display the location and/or the route. The vehicle 10 computer 16 may determine what to display, e.g., out of the request for the input, the location, and the route based on user preferences, e.g., stored on a lookup table or the like.

The vehicle 10 computer 16 may be programmed to receive an input approving transitioning from the boarding state to the driving state. The input approving transitioning from the boarding state to the driving state may indicate an approval of the location. The input approving transitioning from the boarding state to the driving state may indicate an approval of the route. The input may be received from the user interface 34 of the vehicle 10, e.g., in response a user providing such input to the user interface 34. The input may be received from the mobile computer 12, e.g., via wireless or wired communication.

The vehicle 10 computer 16 may be programmed to receive a navigation instruction. As used herein, "navigation instruction" is one or more instructions to the vehicle 10 computer 16 to navigate the vehicle 10 to proceed to a location, e.g., the location included in the instruction to proceed, e.g., along the route. The navigation instruction may be received from the mobile computer 12, e.g., the navigation instruction may be included in the input received from the mobile computer 12.

The vehicle 10 computer 16 may be programmed to actuate vehicle 10 components to proceed to a location, e.g., the vehicle 10 computer 16 may instruct actuation of the propulsion 18, the brake system 20, the steering system 22, etc., based on information received from the navigation system 32, sensors 24, etc. The vehicle 10 computer 16 may actuate vehicle 10 components to navigate to the location included in the instruction to proceed. The vehicle 10 computer 16 may actuate vehicle 10 components to navigate along the route included in the instruction to proceed. The vehicle 10 computer 16 may actuate vehicle 10 components upon receipt of an instruction from the mobile computer 12, e.g., upon receiving the input approving transitioning from the boarding state to the driving state, upon receiving the navigation instruction, etc.

The vehicle 10 computer 16 may be programmed to identify a location of the vehicle 10, e.g., based on information from the navigation system 32. The vehicle 10 computer 16 may transmit the location of the vehicle 10 to the remote computer 30, e.g., via the network 28, and/or to the mobile computer 12, e.g., via wireless or wired communication.

The vehicle 10 computer 16 may be programmed to transmit system data regarding the vehicle 10 computer 16. "System data" means data about hardware and software included in a computer. For example, the system data may indicate what programming is stored on the vehicle 10 computer 16, e.g., software version information, etc., what resources of the vehicle 10 computer 16 are available, e.g., available processing, memory, etc., capabilities. The computer 16 may transmit its system data to the remote computer 30.

The Mobile Computer

The mobile computer 12 may be any one of a variety of computing devices including a processor and a memory, e.g., a smartphone, a tablet, a personal digital assistant, etc. The processor and memory may be implemented as described herein. The mobile computer 12 includes a user interface 36 that presents information to and receives information from a user of the mobile computer 12. The user interface 36 may include a touch-sensitive display screen, speaker, microphone, etc. The mobile computer 12 may include circuits, chips, and antenna to communicate with other computing devices, e.g., the vehicle 10 computer 16 and the remote computer 30, as described herein. The mobile computer 12 may be implemented to determine a location of the mobile computer 12, as described herein. The mobile computer 12 may store map data.

The mobile computer 12 is programmed for wireless communication with the vehicle 10 computer 16. For example, the mobile computer 12 may store identification information, e.g., a unique name or other identifier, Internet protocol (IP) address, etc., for the vehicle 10 computer 16. The mobile computer 12 may establish a wireless communication link with the vehicle 10 computer 16, e.g., a WiFi connection, a Bluetooth® connection, etc.

The mobile computer 12 may be programmed for wired communication with the vehicle 10 computer 16, as described for the wireless communication. The mobile computer 12 may establish a wired communication link with the vehicle 10 computer 16, e.g., via a USB connection.

The mobile computer 12 is programmed to receive the instruction to proceed. The instruction to proceed may be received from the vehicle 10 computer 16 and/or the remote computer 30. The instruction to proceed may include the location and/or the route.

The mobile computer 12 may be programmed to transmit the instruction to proceed to the vehicle 10 computer 16. For example, the mobile computer 12 may transmit such instruction to the vehicle 10 computer 16 via wireless or wired communication. The transmitted instruction to proceed may include the location and/or the route.

The mobile computer 12 is programmed to receive vehicle 10 operation data from the vehicle 10 computer 16. For example, the mobile computer 12 may identify data received from the vehicle 10 computer 16 via the wireless or wired connection as describing the vehicle 10 door 26 status, the vehicle 10 seat occupancy status, the powertrain status, the brake status, the steering status, etc.

The mobile computer 12 is programmed to determine that the vehicle 10 is ready to proceed to the location based on the operation data, e.g., as described above for the vehicle 10 computer 16.

The mobile computer 12 is programmed to display a request for the input approving transitioning from the boarding state to the driving state. For example, the mobile computer 12 may instruct the user interface 36 of the mobile computer 12 to display such request. The mobile computer 12 my display the location and/or the route along with the request, as described above for the vehicle 10 computer 16.

The mobile computer 12 is programmed to receive the input approving transitioning from the boarding state to the driving state. The input approving transitioning from the boarding state to the driving state may indicate an approval of the location and/or the route. The input approving transitioning from the boarding state to the driving state may be received from the user interface 36 of the mobile computer 12, e.g., in response a user providing such input to the user interface 36. The input approving transitioning from the boarding state to the driving state may be transmitted to the vehicle 10 computer 16 upon receiving the user input to the user interface 36, e.g., via wireless or wired communication.

The mobile computer 12 is programmed to transmit the navigation instruction to the vehicle 10 computer 16, e.g., via wireless communication. The navigation instruction may be determined based on the location of the mobile computer 12, the location and/or the route in the instruction to proceed, the map data, etc. The navigation instruction may be included in the input transmitted to the vehicle 10.

The mobile computer 12 may be programmed to transmit a transportation request. The transportation request is a request for the vehicle 10 to navigate to a pickup location, e.g., to pick up a user, and then to navigate to a drop off location, e.g., to drop of the user. The transportation request may be based on a user input to the user interface 36.

The mobile computer 12 may be programmed to transmit its system data to the remote computer 30.

The Remote Computer

The remote computer 30 is a computing device that includes hardware, e.g. circuits, chips, antenna, etc., programmed to transmit, receive, and process information, to and from other computing devices such as the vehicle 10 computer 16, the mobile computer 12, etc., e.g., via the network 28. The remote computer 30 may be one or more computers, each generally including at least one processor and at least one memory, implemented as described herein, the memory storing instructions executable by the processor, including instructions for carrying out various process steps described herein. The remote computer 30 may store map data.

The remote computer 30 may be programmed to receive the location of the vehicle 10, e.g., via the network.

The remote computer 30 may be programmed to select the vehicle 10 computer 16 or the mobile computer 12 to determine whether the vehicle 10 is ready to proceed based on the operation data. For example, the remote computer 30 may select the vehicle 10 computer 16 or the mobile computer 12 based on the system data received from the vehicle 10 computer 16 and the mobile computer 12, e.g., the remote computer 30 may identify which computer 12, 16 has a most recent software version, greater available resources, etc.

The remote computer 30 may be programmed to generate the instruction to proceed including the location and/or the route. The instruction to proceed may be based on one or more transportation requests, e.g., received from the mobile computer 12, another remote computer 30, etc. The location and the route of the instruction to proceed may be based on the pickup location, the drop off location, the location of the vehicle 10, the map data, etc. The instruction to proceed may include the selection of the vehicle 10 computer 16 or the mobile computer 12 to determine whether the vehicle 10 is ready to proceed based on the operation data.

The remote computer 30 may be programmed to transmit the instruction to proceed to the location to the mobile computer 12 and/or the vehicle 10 computer 16, e.g., via the network.

Process

FIGS. 2 through 6 are flow charts illustrating example processes 200, 300, 400, 500, and 600, respectively. For the convenience of the reader, and without limiting or modifying the below discussion, here is a general overview of these Figures and the processes 200, 300, 400, 500, and 600. The process 200 includes steps by which the vehicle 10 computer 16, the mobile computer 12, and the remote computer 30 can cooperatively provide remote vehicle 10 instruction. The process 300 includes steps by which the mobile computer 12 can provide remote vehicle 10 instruction, e.g., according to the process 200 when the mobile computer 12 determines whether the vehicle 10 is ready to proceed. Process 400 includes steps by which the vehicle 10 computer 16 can provide remote vehicle 10 instruction in cooperation with the mobile computer 12 executing the process 300, e.g., according to the process 200. The process 500 includes steps by which the vehicle 10 computer 16 can provide remote vehicle 10 instruction, e.g., according to the process 200 when the vehicle 10 computer 16 determines whether the vehicle 10 is ready to proceed. Process 600 includes steps by which the mobile computer 12 can provide remote vehicle 10 instruction in cooperation with the vehicle 10 computer 16 executing the process 500, e.g., according to the process 200.

Figure 2:
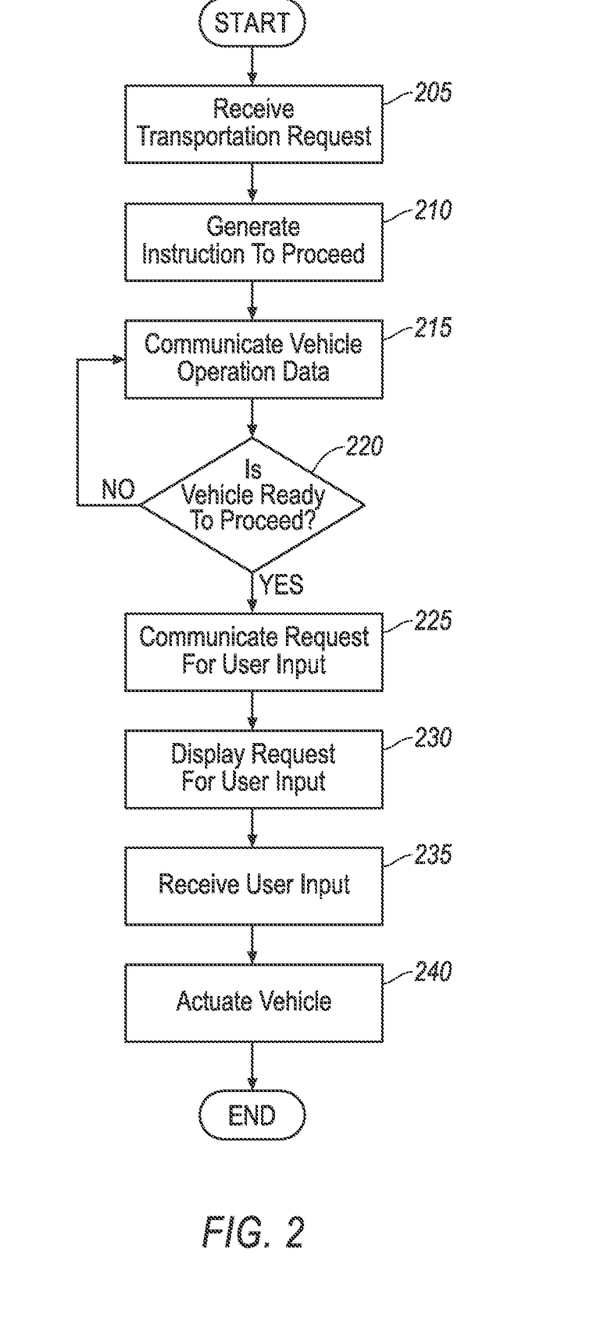
FIG. 2 is an example process of operating the example system for providing remote vehicle instruction.

FIG. 2 is the process flow diagram illustrating the example process 200 for providing remote vehicle 10 instruction. The process 200 may be executed by the vehicle 10 computer 16, the mobile computer 12, and the remote computer 30, as described in more detail below. The process 200 may begin in a block 205 in which the remote computer 30 receives a transportation request, e.g., transmitted from the mobile computer 12 to the remote computer 30, e.g., based on user input to the mobile computer 12.

Next, at a block 210 the remote computer 30 generates an instruction to proceed to a location, e.g., based on the transportation request, and transmits the instruction to the mobile computer 12 and/or the vehicle 10 computer 16. The mobile computer 12 may transmit the instruction to proceed to the vehicle 10 computer 16, and vice versa. The instruction to proceed may include a location and a route, as described above. The instruction to proceed may identify the selection of the vehicle 10 computer 16 or the mobile computer 12 to determine whether the vehicle 10 is ready to proceed based on the operation data.

Next, at a block 215, the vehicle 10 computer 16 receives vehicle 10 operation data from vehicle 10 components via the in-vehicle communication network 14. Further, the vehicle 10 computer 16 may transmit the operation data to the mobile computer 12. The operation data may be communicated throughout the process 200. Throughout the process 200 means at time intervals, e.g., every 500 milliseconds, substantially continuously, etc.

Next, at a block 220 the vehicle 10 computer 16 or the mobile computer 12 determines whether the vehicle 10 is ready to proceed based on the operation data, as described herein. Whether the vehicle 10 computer 16 or the mobile computer 12 makes such determination may be based on the identification of the selection in the instruction to proceed. Upon a determination that the vehicle 10 is ready to proceed the process 200 moves to a block 225. Upon a determination that the vehicle 10 is not ready to proceed the process 200 returns to the block 215.

At the block 225 the vehicle 10 computer 16 transmits a request for user input, e.g., approving transitioning from a boarding state to a driving state, the location of the instruction to proceed, and/or the route, to the mobile computer 12. The request may be transmitted in response to the vehicle 10 computer 16 determining the vehicle 10 is ready to proceed.

Next, at a block 230 the vehicle 10 computer 16 and/or the mobile computer 12 displays the request for user input, e.g., on the user interface(s) 34, 36. The mobile computer 12 may additionally display the location and/or the route. The request may be displayed upon receiving the request from the vehicle 10 computer 16. Alternately, the mobile computer 12 may generate and display the request without receiving the request from the vehicle 10 computer 16, e.g., upon the mobile computer 12 determining the vehicle 10 is ready to proceed.

Next, at a block 235 the mobile computer 12 transmits user input approving the request, or a navigation instruction, to the vehicle 10 computer 16. The user input approving the request or the navigation instruction may be transmitted upon receiving user input via the user interface 36. The mobile computer 12 transmits user input approving the request when the vehicle 10 computer 16 determines whether the vehicle 10 is ready to proceed. The mobile computer 12 transmits the navigation instruction when the mobile computer 12 determines whether the vehicle 10 is ready to proceed. Additionally or alternatively, the user input may be provided to the vehicle 10 computer 16 via the vehicle 10 user interface 34.

Next, at a block 240 the vehicle 10 computer 16 actuates vehicle 10 components to navigate the vehicle 10, e.g., to the location of the instruction to proceed, along the route, etc. For example, the block 240 is executed in response to receiving the user input or the navigation instruction described above concerning the block 235. After the block 240 the process 200 may end. Alternatively, the process 200 may return to the block 205 to communicate one or more additional instructions to proceed.

Figure 3:
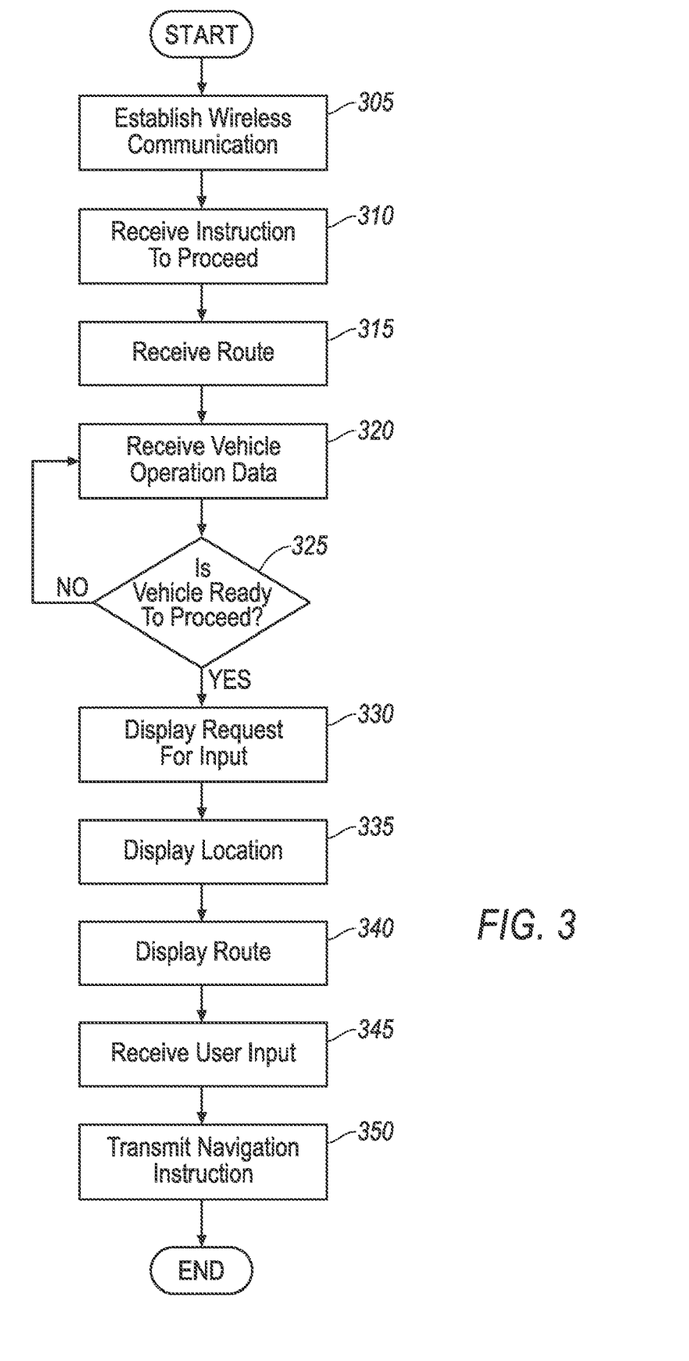
FIG. 3 is an example process of operating an example mobile computer for providing remote vehicle instruction.

FIG. 3 is the process flow diagram illustrating the example process 300 of operating the mobile computer 12 for providing remote vehicle 10 instruction, e.g., when the mobile computer 12 is designated to determine whether the vehicle 10 is ready to proceed in the process 200, e.g., as described above for the block 210. The process 300 begins in a block 305 in which the mobile computer 12 establishes wireless communication with the vehicle 10 computer 16, e.g., a WiFi connection, a Bluetooth connection, etc.

At a block 310 the mobile computer 12 receives an instruction to proceed to a location, e.g., from the vehicle 10 computer and/or the remote computer 30, as described above for the block 210.

At a block 315 the mobile computer 12 receives a route to the location, e.g., from the vehicle 10 computer and/or the remote computer 30. The route may be included in the instruction to proceed, as described above for the block 210.

At a block 320 the mobile computer 12 receives vehicle 10 operation data from the vehicle 10 computer 16, as described above for the block 215. Further, operation data may be received throughout the process 300. Throughout the process 300 means at time intervals, e.g., every 500 milliseconds, substantially continuously, etc.

At a block 325 the mobile computer 12 determines whether the vehicle 10 is ready to proceed based on the operation data, as described above for the block 220. Upon a determination that the vehicle 10 is ready to proceed the process 300 moves to a block 330. Upon a determination that the vehicle 10 is not ready to proceed the process 300 returns to the block 320.

At a block 330 the mobile computer 12 displays a request for user input, e.g., approving transitioning from a boarding state to a driving state, the location of the instruction to proceed, and/or the route, e.g., on the user interface 36, as described above for the block 230.

At a block 335 the mobile computer 12 displays the location, e.g., along with the request.

At a block 340 the mobile computer 12 displays the route, e.g., along with the request.

Next, at a block 345 the mobile computer 12 receives user input approving the request, e.g., via the user interface 36, as described above for the block 235.

Next, at a block 350 the mobile computer 12 transmits a navigation instruction to the vehicle 10 computer 16, as described above for the block 235. The instruction may be transmitted in response to receiving the user input. After the block 350 the process 300 may end. Alternatively, the process 300 may return to the block 310 to receive one or more additional instructions to proceed.

Figure 4:
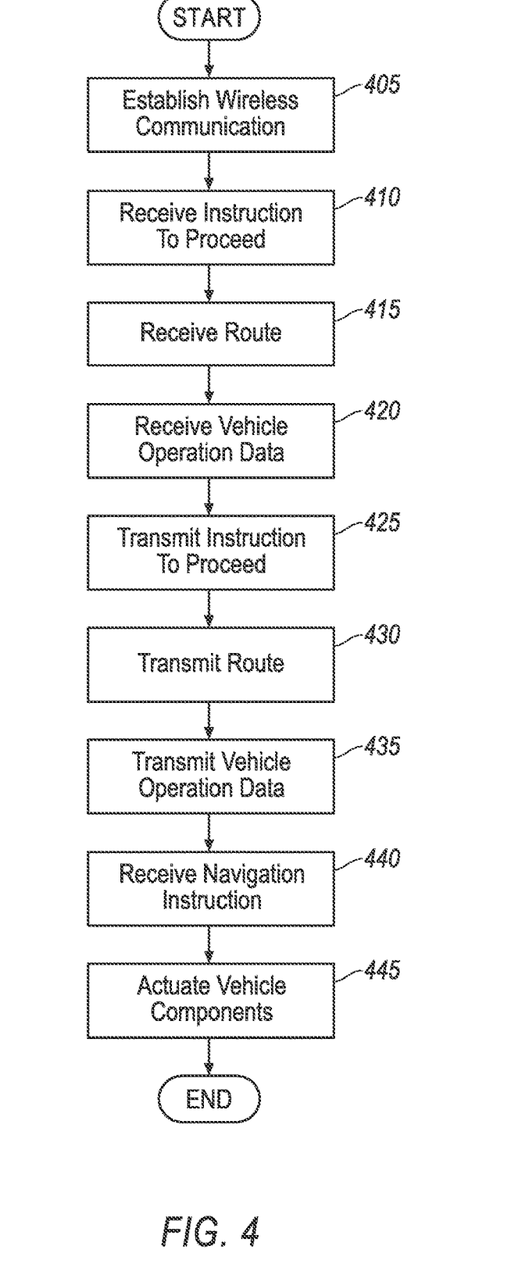
FIG. 4 is an example process of operating an example vehicle computer in conjunction with the example mobile computer executing the example process of FIG. 3.

FIG. 4 is the process flow diagram illustrating the example process 400 of operating the vehicle 10 computer 16 in conjunction with the mobile computer 12 executing the process 300, e.g., when the mobile computer 12 is selected to determine whether the vehicle 10 is ready to proceed in process 200. The process 400 begins in a block 405 in which the vehicle 10 computer 16 establishes wireless communication with the mobile computer 12, e.g., a WiFi connection, a Bluetooth connection, etc.

At a block 410 the vehicle 10 computer 16 receives the instruction to proceed to the location, e.g., from the remote computer 30, as described above for the block 210.

At a block 415 the vehicle 10 computer 16 receives the route to the location, e.g., from the remote computer 30. The route may be included in the instruction to proceed, as described above for the block 210.

At a block 420 the vehicle 10 computer 16 receives vehicle 10 operation data from the vehicle 10 components via the in-vehicle communication network 14, as described above for the block 215. Further, the operation data may be received throughout the process 400. Throughout the process 400 means at time intervals, e.g., every 500 milliseconds, substantially continuously, etc.

At a block 425 the vehicle 10 computer 16 transmits the instruction to proceed to the mobile computer 12, as described above for the block 210.

At a block 430 the vehicle 10 computer 16 transmits the route to the mobile computer 12. The route may be transmitted with the instruction to proceed, as described above for the block 210.

At a block 435 the vehicle 10 computer 16 transmits the vehicle 10 operation data to the mobile computer 12, as described above for the block 215. Further, the operation data may be transmitted throughout the process 400.

Next, at a block 440 the vehicle 10 computer 16 receives the navigation instruction from the mobile computer 12, as described above for the block 235.

Next, at a block 445 the vehicle 10 computer 16 actuates the vehicle 10 components to navigate the vehicle 10, e.g., to the location included in the instruction to proceed, e.g., along the route, as described above for the block 240. The vehicle 10 computer 16 actuates the vehicle 10 components in response to receiving the navigation instruction. After the block 445 the process 400 may end. Alternatively, the process 400 may return to the block 410 to receive one or more additional instructions to proceed.

Figure 5:
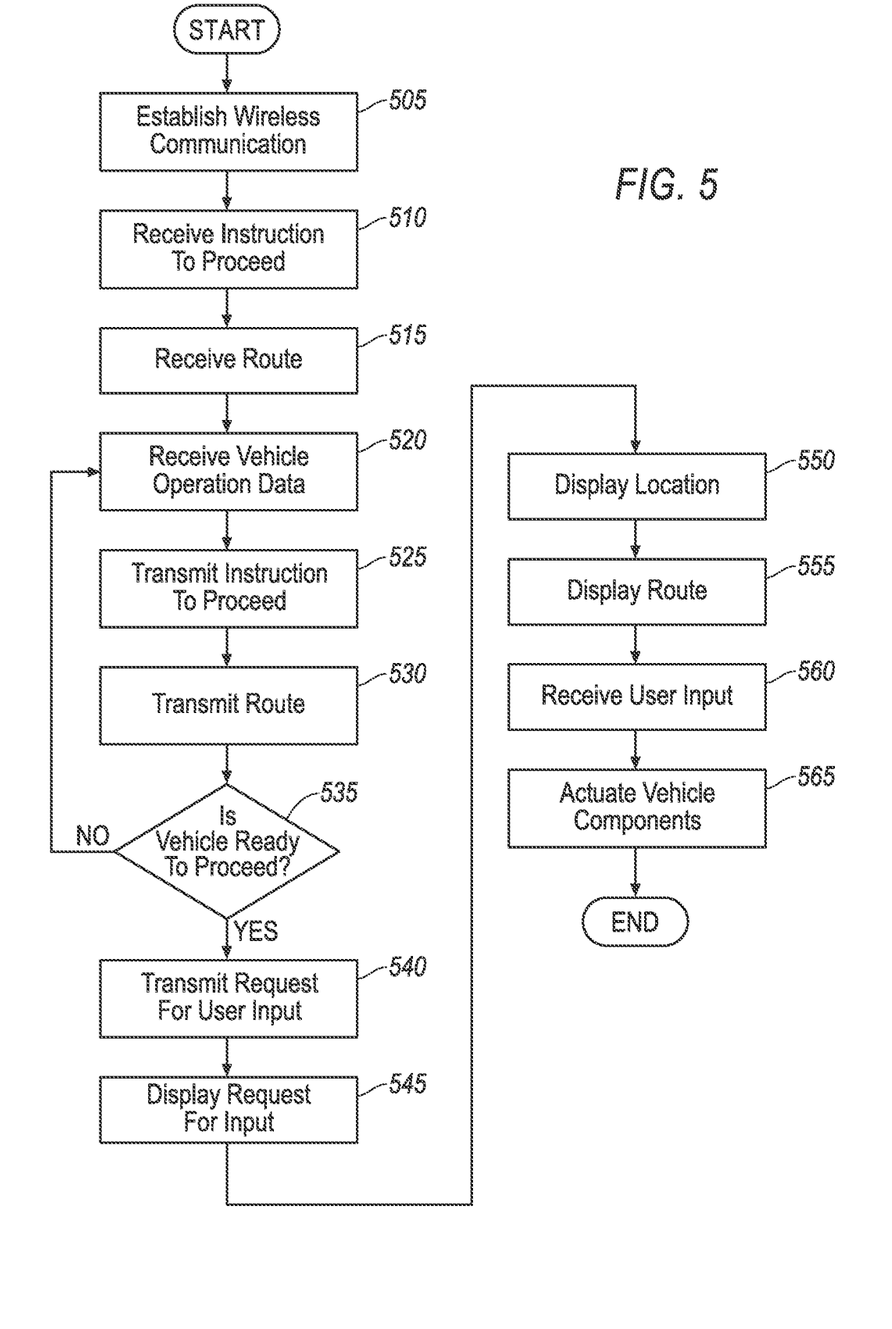
FIG. 5 is an example process of operating an example vehicle computer for providing remote vehicle instruction.

FIG. 5 is the process flow diagram illustrating the example process 500 of operating the vehicle 10 computer 16 for providing remote vehicle 10 instruction, e.g., when the vehicle 10 computer 16 is selected to determine whether the vehicle 10 is ready to proceed in the process 200, e.g., as described above for the block 210. The process 500 begins in a block 505 in which the vehicle 10 computer 16 establishes wireless communication with the mobile computer 12, e.g., a WiFi connection, a Bluetooth connection, etc.

At a block 510 the vehicle 10 computer 16 receives an instruction to proceed to a location, e.g., from the remote computer 30, as described above for the block 210.

At a block 515 the vehicle 10 computer 16 receives a route to the location. The route may be included in the instruction to proceed, as described above for the block 210.

At a block 520 the vehicle 10 computer 16 receives vehicle 10 operation data from the vehicle 10 components via the in-vehicle communication network 14, as described above for the block 215. The operation data may be received throughout the process 500. Throughout the process 500 means at time intervals, e.g., every 500 milliseconds, substantially continuously, etc.

At a block 525 the vehicle 10 computer 16 transmits the instruction to proceed to the mobile computer 12, as described above for the block 210.

At a block 530 the vehicle 10 computer 16 transmits the route to the mobile computer 12. The route may be transmitted with the instruction to proceed, as described above for the block 210.

At a block 535 the vehicle 10 computer 16 determines whether the vehicle 10 is ready to proceed based on the operation data, as described above for the block 220. Upon a determination that the vehicle 10 is ready to proceed the process 500 moves to a block 540. Upon a determination that the vehicle 10 is not ready to proceed, the process 500 returns to the block 520.

At a block 540 the vehicle 10 computer 16 transmits a request for user input, e.g., approving transitioning from a boarding state to a driving state, the location of the instruction to proceed, and/or the route, to the mobile computer 12, as described above for the block 225.

At a block 545 the vehicle 10 computer 16 displays the request for user input, e.g., on the user interface 34, as described above for the block 230.

At a block 550 the vehicle 10 computer 16 displays the location, e.g., along with the request.

At a block 555 the vehicle 10 computer 16 displays the route, e.g., along with the request.

Next, at a block 560 the vehicle 10 computer 16 receives user input approving the request, e.g., via the user interface 34 and/or the mobile computer 12, as described above for the block 235.

Next at a block 565 the vehicle 10 computer 16 actuates the vehicle 10 components, e.g., to navigate the vehicle 10 to the location, along the route, etc., as described above for the block 240. The vehicle 10 computer 16 actuates the vehicle 10 components in response to receiving the user input. After the block 565 the process 500 may end. Alternatively, the process 500 may return to the block 510 to receive one or more additional instructions to proceed.

Figure 6:
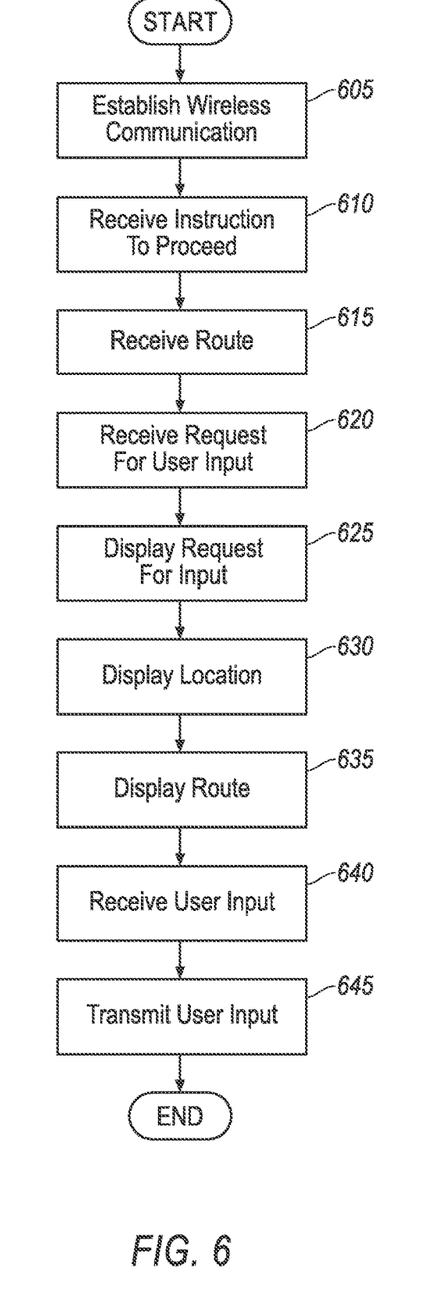
FIG. 6 is an example process of operating an example mobile computer in conjunction with the example vehicle computer executing the example process of FIG. 5.

FIG. 6 is the process flow diagram illustrating the example process 600 of operating the mobile computer 12 in conjunction with the vehicle 10 computer 16 executing the process 500, e.g., when the vehicle 10 computer 16 is selected to determine whether the vehicle 10 is ready to proceed in process 200. The process 600 begins in a block 605 in which the mobile computer 12 establishes wireless communication with the vehicle 10 computer 16, e.g., a WiFi connection, a Bluetooth connection, etc.

At a block 610 the mobile computer 12 receives the instruction to proceed to the location from the vehicle 10 computer 16, as described above for the block 210.

At a block 615 the mobile computer 12 receives the route to the location from the vehicle 10 computer 16. The route may be included in the instruction to proceed, as described above for the block 210.

At a block 620 the mobile computer 12 receives the request for user input from the vehicle 10 computer 16, as described above for the block 225.

At a block 625 the mobile computer 12 displays the request for user input, e.g., on the user interface 36, as described above for the block 230.

At a block 630 the mobile computer 12 displays the location, e.g., along with the request, as described above for the block 230.

At a block 635 the mobile computer 12 displays the route, e.g., along with the request, as described above for the block 230.

Next, at a block 640 the mobile computer 12 receives the user input approving the request, e.g., via the user interface 36, as described above for the block 235.

Next, at a block 645 the mobile computer 12 transmits the user input approving the request to the vehicle 10 computer 16, as described above for the block 235. After the block 640 the process 600 may end. Alternatively, the process 600 may return to the block 610 to receive one or more additional instructions to proceed.

CONCLUSION

A computer is a computing device that includes a processor and a memory.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to execute the processes and programming described herein.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors. The memory may store program instructions executable by the processor to perform the processes and programming described herein.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

What is claimed is:

1. A system, comprising a mobile computer, programmed to:
    receive, from a vehicle computer, an instruction to proceed to a location and vehicle operation data from an in-vehicle communications network;
    determine that a vehicle is ready to proceed to the location based on the operation data;
    receive user input approving transitioning from a boarding state to a driving state; and
    then instruct the vehicle computer to actuate vehicle components to proceed to the location.

2. The system of claim 1, wherein the vehicle operation data includes at least one of a vehicle door status and a vehicle seat occupancy status.

3. The system of claim 1, wherein the vehicle operation data includes at least one of a powertrain status, a brake status, and a steering status.

4. The system of claim 1, wherein the in-vehicle communications network is a controller area network (CAN) bus.

5. The system of claim 1, wherein the mobile computer is further programmed for wireless communication with the vehicle computer.

6. The system of claim 1, the mobile computer further programmed to:
    display a request for the input approving transitioning from the boarding state to the driving state before receiving the input; and
    transmit the input to the vehicle computer upon receiving the input.

7. The system of claim 6, the mobile computer further programmed to:
    receive, from the vehicle computer, the location along with the request for the input approving transitioning from the boarding state to the driving state; and
    display the location along with a request for the input.

8. The system of claim 6, the mobile computer further programmed to:
    receive, from the vehicle computer, in addition to the instruction to proceed to the location, a route to the location; and
    display the route along with the request for the input approving transitioning from the boarding state to the driving state.

9. The system of claim 1, further comprising the vehicle computer, the vehicle computer programmed to:
    receive the location from a remote computer; and
    actuate the vehicle components to proceed to the location.

10. The system of claim 9, the vehicle computer further programmed to:
    receive, from the remote computer, in addition to the instruction to proceed to the location, a route to the location; and
    to actuate the vehicle components to proceed to the location along the route.

11. A system comprising a vehicle computer, programmed to:
    receive, from a remote computer, an instruction to proceed to a location;
    determine that a vehicle is ready to proceed to the location based on vehicle operation data from an in-vehicle communications network;

transmit, to a mobile computer, the instruction to proceed to the location; and upon receipt of an instruction from the mobile computer, actuate vehicle components to proceed to the location.

12. The system of claim 11, wherein the vehicle operation data includes at least one of a vehicle door status, a vehicle seat occupancy status, a powertrain status, a brake status, and a steering status.

13. The system of claim 11, wherein the in-vehicle communications network is a controller area network (CAN) bus.

14. The system of claim 11, wherein the vehicle computer is further programmed for wireless communication with the mobile computer.

15. The system of claim 11, the vehicle computer further programmed to:

display a request for an input approving transitioning from a boarding state to a driving state;

receive the input; and then actuate vehicle components to proceed to the location.

16. The system of claim 15, the vehicle computer further programmed to:

receive, from the mobile computer, in addition to the instruction from the mobile computer, a route to the location; and display the route along with the request for the input approving transitioning from the boarding state to the driving state.

17. The system of claim 11, the vehicle computer further programmed to transmit, to the mobile computer, the location along with a request for an input approving transitioning from a boarding state to a driving state, wherein the instruction from the mobile computer incudes the input.

18. The system of claim 11, the vehicle computer further programmed to:

transmit, to the mobile computer, in addition to the instruction to proceed to the location, a route to the location.

19. A system, comprising:

a vehicle computer, programmed to:

receive an instruction to proceed to a location and vehicle operation data, and transmit the operation data; and a mobile computer, programmed to:

receive the instruction to proceed to the location and the operation data, determine that a vehicle is ready to proceed based on the operation data, receive user input approving the location, and then instruct actuation of the vehicle to proceed to the location.

20. The system of claim 19, wherein the vehicle computer receives the operation data from an in-vehicle communications network, the vehicle computer further programmed to transmit the operation data to the mobile computer.

* * * * *

UNITED STATES PATENT AND TRADEMARK OFFICE
CERTIFICATE OF CORRECTION

PATENT NO. : 10,437,244 B2  
APPLICATION NO. : 15/652545  
DATED : October 8, 2019  
INVENTOR(S) : Jeffrey Yizhou Hu et al.

Page 1 of 1

It is certified that error appears in the above-identified patent and that said Letters Patent is hereby corrected as shown below:

On the Title Page

Item (54) and in the Specification, Column 1, Line 1:  
Change the title as follows: "REMOTE VEHICLE INSTURCTION" to --REMOTE VEHICLE INSTRUCTION--

Signed and Sealed this  
Twelfth Day of November, 2019

Andrei Iancu  
*Director of the United States Patent and Trademark Office*